(12) United States Patent
Tanaka

(10) Patent No.: US 6,425,022 B1
(45) Date of Patent: Jul. 23, 2002

(54) SYSTEM FOR READING BLOCKS OF DIFFERENT SIZES BY MAINTAINING BUFFER PAGE POINTER WHEN WORD COUNT IS NOT GREATER THAN GUARDBAND, AND RESET WORD COUNT THEREAFTER

(75) Inventor: Akio Tanaka, Alta, CA (US)

(73) Assignee: Oak Technology, Inc., Sunnyvale, CA (US)

( * ) Notice: Subject to any disclaimer, the term of this patent is extended or adjusted under 35 U.S.C. 154(b) by 0 days.

(21) Appl. No.: 09/330,927

(22) Filed: Jun. 11, 1999

(51) Int. Cl.$^7$ .............................................. G06F 13/14
(52) U.S. Cl. ............................ 710/34; 710/52; 711/100
(58) Field of Search ............................. 710/34, 52, 54, 710/56, 57; 711/100, 170–173; 370/252

(56) References Cited

U.S. PATENT DOCUMENTS 5,864,713 A * 1/1999 Terry ........................... 710/52
6,233,226 B1 * 5/2001 Gringeri et al. ............ 370/252
6,314,477 B1 * 11/2001 Cowger et al. .............. 710/52

\* cited by examiner

Primary Examiner—Thomas Lee
Assistant Examiner—Thuan Du
(74) Attorney, Agent, or Firm—John F. Schipper

(57) ABSTRACT

A method and apparatus are disclosed for enabling blocks of various sizes to be read from a storage medium without causing subsequent errors to be experienced by a host. According to one embodiment, the present invention receives information read from a block, and maintains a count of the amount of information received. As the information is received, a determination is made as to whether an indication of the beginning of a subsequent block has been detected. If so, then a determination is made as to whether the current count is within a predetermined guardband. If the current count is not within the guardband, then a buffer page pointer or a block counter is incremented. However, if the current count is within the guardband, then the buffer page pointer or the block counter is not incremented but is rather maintained at its current value. By maintaining the buffer page pointer or the block counter at its current value, the present invention prevents an oversized block from being buffered or counted as two blocks. By not double counting the oversized block, the present invention prevents extra blocks from being sent to a host. This in turn prevents the host from experiencing any problems caused by overcounting.

20 Claims, 9 Drawing Sheets

SYSTEM FOR READING BLOCKS OF DIFFERENT SIZES BY MAINTAINING BUFFER PAGE POINTER WHEN WORD COUNT IS NOT GREATER THAN GUARDBAND, AND RESET WORD COUNT THEREAFTER

FIELD OF THE INVENTION

This invention relates generally to storage systems and more particularly to a method and apparatus for reading blocks of different sizes from a storage medium.

BACKGROUND OF THE INVENTION

Traditionally, mass storage systems have been based upon magnetic media, such as floppy disks, hard drives, and tapes. In recent years, however, because of their high storage capacities, optical media have also been used effectively for mass storage purposes. Optical media include CD-ROM's (compact disk-read only memory), recordable CD's, and re-writable CD's. Typically, information is written onto an optical medium by imposing marks and spaces or pits and lands onto the medium. These marks and spaces or pits and lands are later detected by a reading mechanism to extract information from the optical medium.

Typically, information is written onto a CD in the form of packets. Each packet usually comprises a certain number of data blocks, and each packet is separated from other packets by a link sequence. A typical packet arrangement is shown in FIG. 1, wherein a plurality of packets 102 are shown with link sequences 104 imposed therebetween. The link sequences 104 provide distinct separations between the data packets 102, which makes management of data on the CD much simpler.

As shown, a typical link sequence 104 comprises a series of seven blocks. These blocks include two RUNOUT blocks 106, 108, one link block 110, and four RUNIN blocks 112–118. The RUNOUT blocks 106, 108 signal the end of the previous packet, the RUNIN blocks 112–118 signal the beginning of the next packet, and the link block 110 provides the transition between the RUNOUT blocks 106, 108 and the RUNIN blocks 112–118. One of the main purposes of the link sequence blocks 106–118 is to provide sufficient "padding" to enable the writing and reading mechanisms to start and to stop gracefully.

To elaborate, when writing information onto a CD, it is often necessary to stop the writing mechanism after writing a certain packet, and then to restart the writing mechanism to write the next packet. This is especially true in recordable and rewritable CD systems. The link sequence blocks 106–118 are designed to accommodate this. Specifically, when the writing mechanism is writing the last packet of a file, it: (1) writes the last data packet; (2) writes the two RUNOUT blocks 106, 108; (3) writes a portion of the link block 110; and (4) then stops gracefully. When it comes time to write the next data packet, the writing mechanism: (1) starts gracefully; (2) completes writing the link block 110; (3) writes the RUNIN blocks 112–118; and (4) then writes the next data packet. Ideally, in completing the link block 110, the writing mechanism starts writing at precisely the point at which it previously stopped. Unfortunately, due to limitations in the current technology, this level of precision is often not possible. As a result, the writing mechanism often starts writing at a location before or after the proper location, which leads to the link block 110 being shorter or longer than the rest of the link sequence blocks 106–108, 112–118. This variation in size of the link block 110 can lead to serious problems when it comes time to read the CD.

To illustrate this problem, reference will be made to FIG. 2. FIG. 2 shows a sample set of link sequence blocks 106–118 in which the link block 110 is longer than the rest of the blocks. FIG. 2 also shows a buffer 204, having buffer portions BU1–BU8, which may be used to buffer the information contained in the link sequence blocks 106–118. Given the setup shown in FIG. 2, a typical reading mechanism operates as follows. The mechanism begins reading the link sequence blocks by reading the first RUNOUT block 106. The first portion of block 106 encountered by the reading mechanism is the SYNCH portion 202, which indicates the beginning of the block 106. In response to the SYNCH portion, the reading mechanism increments the buffer pointer to position P1, which points to the beginning of buffer portion BU1 206. The mechanism then reads and stores the contents of RUNOUT block 106 into buffer portion BU1 206. The first RUNOUT block 106 is thus read and buffered.

Thereafter, the reading mechanism proceeds to read the second RUNOUT block 108. Again, it encounters a SYNCH portion 202 at the beginning of the block. The contents of this SYNCH portion 202 are stored at the end of buffer portion BU1 206. In response to the SYNCH portion 202, the reading mechanism increments the buffer pointer to position P2, which points to the beginning of buffer portion BU2 208. The mechanism then reads and stores the contents of RUNOUT block 108 into buffer portion BU2 208. The second RUNOUT block 208 is thus buffered.

Now, the reading mechanism proceeds to read the link block 110. As with the previous two blocks, it encounters a SYNCH portion 202 at the beginning of the block 110. The contents of this SYNCH portion 202 are stored at the end of buffer portion BU2 208. In response to the SYNCH portion 202, the reading mechanism increments the buffer pointer to position P3. The mechanism then proceeds to read and to store the contents of the link block 110 into buffer portion BU3 210. However, when the reading mechanism reaches the portion of the link block 110 indicated by the dashed line 230, the mechanism realizes that it has not detected a SYNCH portion for an N number of words, where N is the typical size of one of the blocks 106–108, 112–118. In response to this realization, the reading mechanism automatically increments the buffer pointer to position P4. Thereafter, the mechanism continues reading the remainder of the link block 110, and storing the remainder into buffer portion BU4 212.

After reading the link block 110, the reading mechanism encounters the SYNCH portion 202 at the beginning of the first RUNIN block 112. This SYNCH portion 202, the contents of which are stored into buffer portion BU4 212, causes the buffer pointer to be incremented to position P5. This in turn causes the remainder of buffer portion BU4 212 to be left unused. Thereafter, the reading mechanism reads and stores the contents of RUNIN block 112 into buffer portion BU5 214. RUNIN block 112 is thus buffered. This process of reading and buffering the link sequence blocks continues until the contents of RUININ block 114 and the SYNCH portion 202 of RUNIN block 116 are stored into buffer portion BU6 216, the contents of RUININ block 116 and the SYNCH portion 202 of RUNIN block 118 are stored into buffer portion BU7 218, and the contents of RUININ block 118 and the SYNCH portion 202 of the next data block are stored into buffer portion BU8 220.

Notice that by the end of the buffering process, eight buffer portions BU1–BU8 are used. This is so despite the fact that in actuality only seven sequence blocks were read. The extra buffer portion resulted from the oversized link block 110 being effectively counted as two blocks. When the eight buffer portions BU1–BU8 are subsequently passed on to a host, they cause the host to erroneously believe that eight rather than seven blocks have actually been read. This over-counting of blocks may cause the host to erroneously treat a link sequence block as a data block (since the host is expecting only seven link sequence blocks, it may treat the eighth block BU8 as a data block). Over-counting may also cause the host to calculate offsets incorrectly, and to experience other serious errors. Thus, the variation in size of the link block 110 can lead to significant problems. As a result, a solution to the size variation problem is needed.

SUMMARY OF THE INVENTION

The present invention provides an improved method and apparatus for reading blocks from a storage medium, which enables blocks of different sizes to be read without causing subsequent errors to be experienced by a host. The present invention is based, at least partially, upon two observations. The first observation is that it is not necessary to increment a buffer page pointer or a page counter in response to every indication of the beginning of a new or subsequent block. The second observation is that link sequence blocks are mainly used for padding purposes and thus typically do not contain actual data. Hence, certain portions of link sequence blocks may be overwritten without doing any harm. These observations are used advantageously by the present invention to prevent block size variations from causing subsequent errors.

Specifically, the present invention implements the concept of a guardband to prevent double counting of oversized blocks. Under the guardband concept, each time an indication of the beginning of a new or subsequent block is detected, a check is made to determine whether the current word count (indicating the number of words that have been read since the last time a buffer page pointer or a block counter was incremented) is within a predetermined guardband. If it is, then it means that the buffer page pointer or the block counter was incremented just recently, meaning that the information being read is most likely the remainder of an oversized block. In such a case, the buffer page pointer or the block counter is not incremented but is rather maintained at its current value. By doing so, the present invention prevents the oversized block from being counted as two blocks, which in turn prevents subsequent errors from being experienced by a host. The fact that these values are not incremented may cause a part of a block to be overwritten in a buffer page. However, as noted above, since the link sequence blocks do not contain actual data, overwriting a portion of a block will not do any harm. Thus, the present invention effectively prevents the overcounting of blocks without causing any undesirable side effects.

DETAILED DESCRIPTION OF THE EMBODIMENTS(S)

Figure 1:
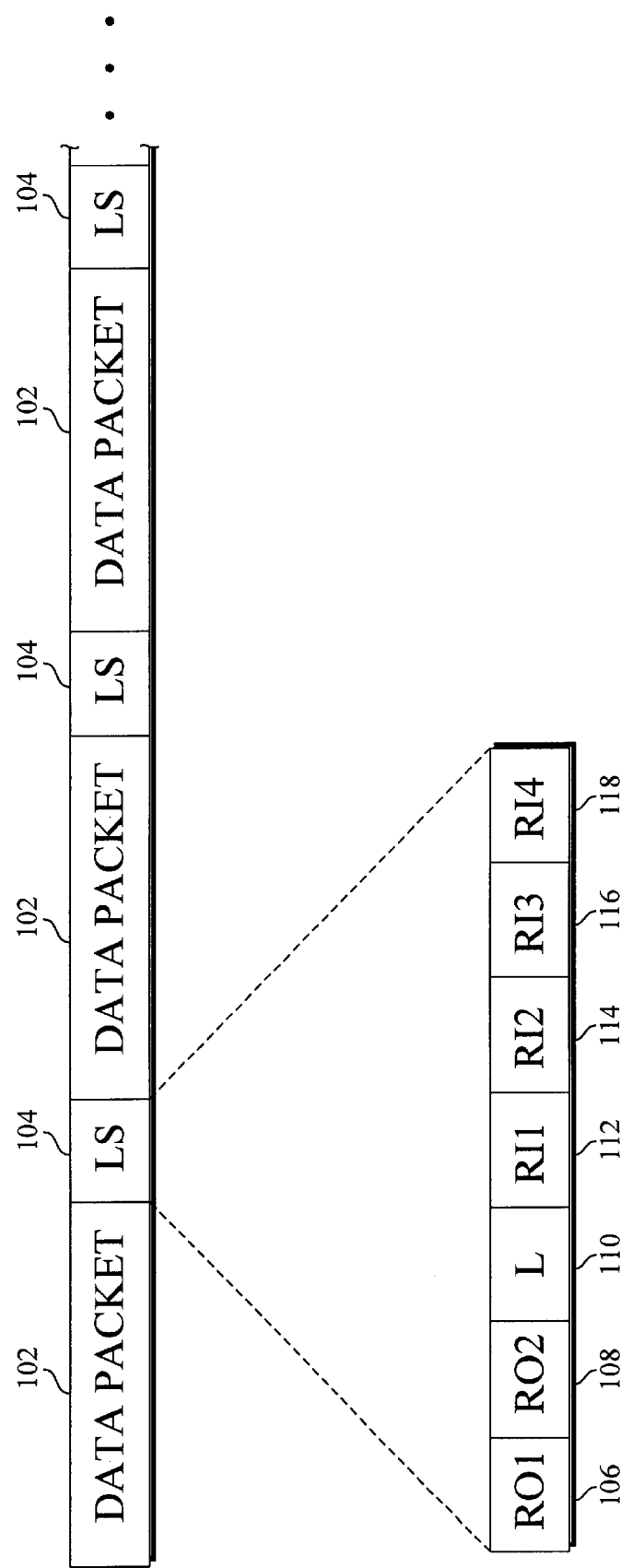
FIG. 1 is a logical diagram illustrating a typical manner in which packets of information are stored on a storage medium.
Figure 2:
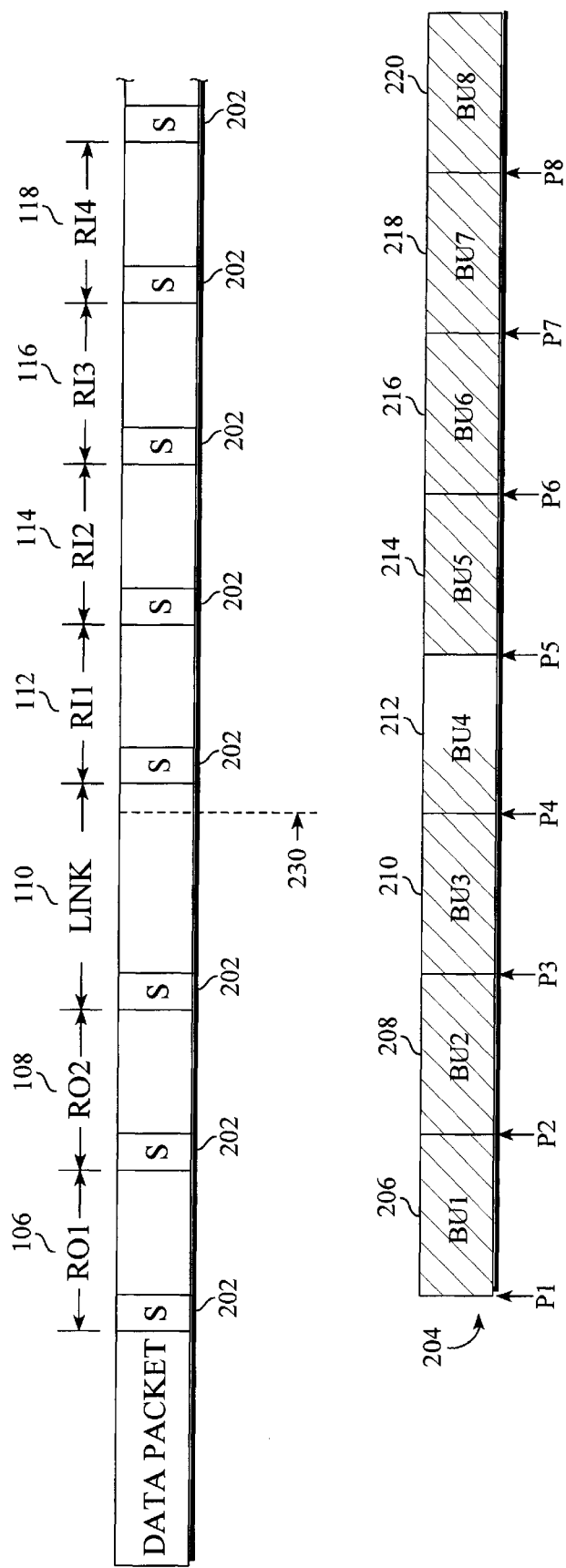
FIG. 2 is a logical diagram illustrating a typical manner in which blocks in a link sequence may be buffered.
Figure 3:
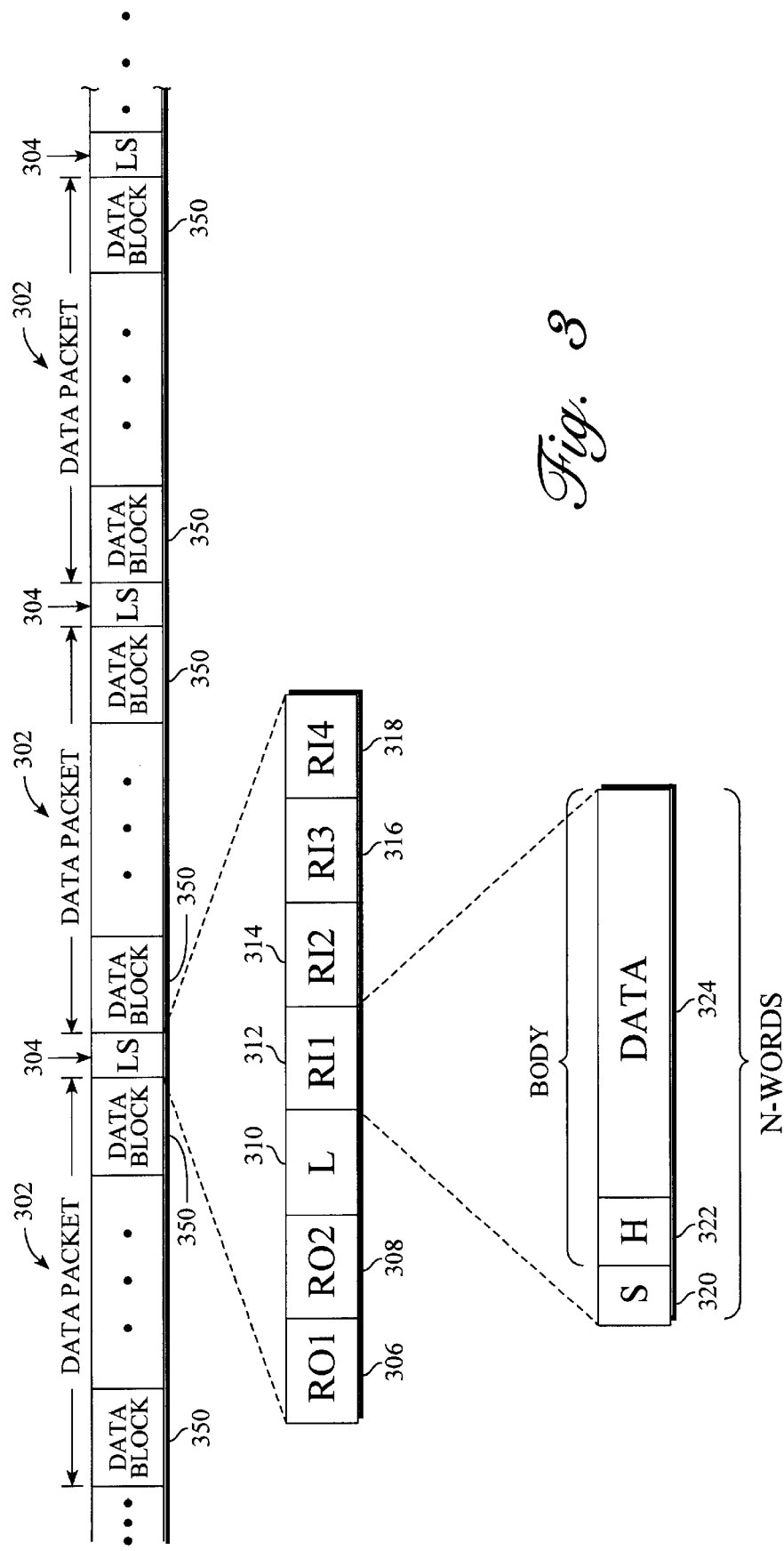
FIG. 3 is a logical diagram illustrating the manner in which information is stored on a storage medium in accordance with one embodiment of the present invention.

With reference to FIG. 3, there is shown one possible arrangement for storing information on a storage medium in accordance with one embodiment of the present invention. As shown, information is stored on the storage medium in the form of data packets 302, with each data packet 302 being separated from other data packets 302 by link sequences 304. The link sequences 304 provide distinct separations between the data packets 302 to make managing access to the packets 302 much simpler. In one embodiment, each data packet 302 comprises thirty two data blocks 350; however, it should be noted that for purposes of the present invention, a data packet 302 may comprise any number of data blocks 350.

In one embodiment, each link sequence 304 comprises a series of seven link sequence blocks 306–318. As shown, these blocks include two RUNOUT blocks 306, 308, one link block 310, and four RUNIN blocks 312–318. The RUNOUT blocks 306, 308 signal the end of the previous data packet 302, the RUNIN blocks 312–318 signal the beginning of the next packet 302, and the link block 310 provides the transition between the RUNOUT blocks 306, 308 and the RUNIN blocks 312–318. One of the main purposes of the link sequence blocks 306–318 is to provide sufficient "padding" to enable the writing and reading mechanisms to start and to stop gracefully.

According to one embodiment, each block, whether it be a data block 350 or a link sequence block 306–318, has the format shown in FIG. 3 for RUNIN block RI1 312. Specifically, at the beginning of each block, there is a SYNCH portion 320. This SYNCH portion 320 indicates to a reading mechanism the beginning of a new or subsequent block. Hence, the SYNCH portion 320 acts as the herald of a block. Following the SYNCH portion 320 is a header portion 322 which provides information specific to that particular block. This information includes the location of the block on the storage medium. Where the storage medium is a CD, for example, the location information may be expressed in terms of minutes, seconds, and block number, which specify how far into the CD, in terms of time, the block resides. The header information may also specify the type of the block, i.e. whether it is a data block 350, a RUNOUT block 306–308, a link block 310, or a RUNIN block 312–318. The type of the block may determine the manner in which the block is read and processed. Following the header portion 322 is the data portion 324 of the block. For a data block 350, this portion 324 will contain actual data. For a link sequence block 306–318, however, this portion 324 will contain some arbitrary pattern of 1's and 0's, such as all 1's, all 0's, or an arbitrary combination thereof. Since the link sequence blocks 306–318 are mainly used for "padding", they do not contain any actual data.

Together, the SYNCH portion 320, the header portion 322, and the data portion 324 have a combined size of N-words, where a word may be any size, ranging from one byte to multiple bytes. For purposes of the present invention, N may be set to any desired number. For the sake of convenience, the header portion 322 and the data portion 324 of a block will be referred to herein as the "body" of a block.

Ideally, each and every block should be exactly N-words long. However, as noted previously, due to lack of precision in the writing process, the link block 310 is often shorter or longer than N-words. This lack of uniformity can lead to errors in the reading process. The present invention provides a solution to this problem.

Figure 4:
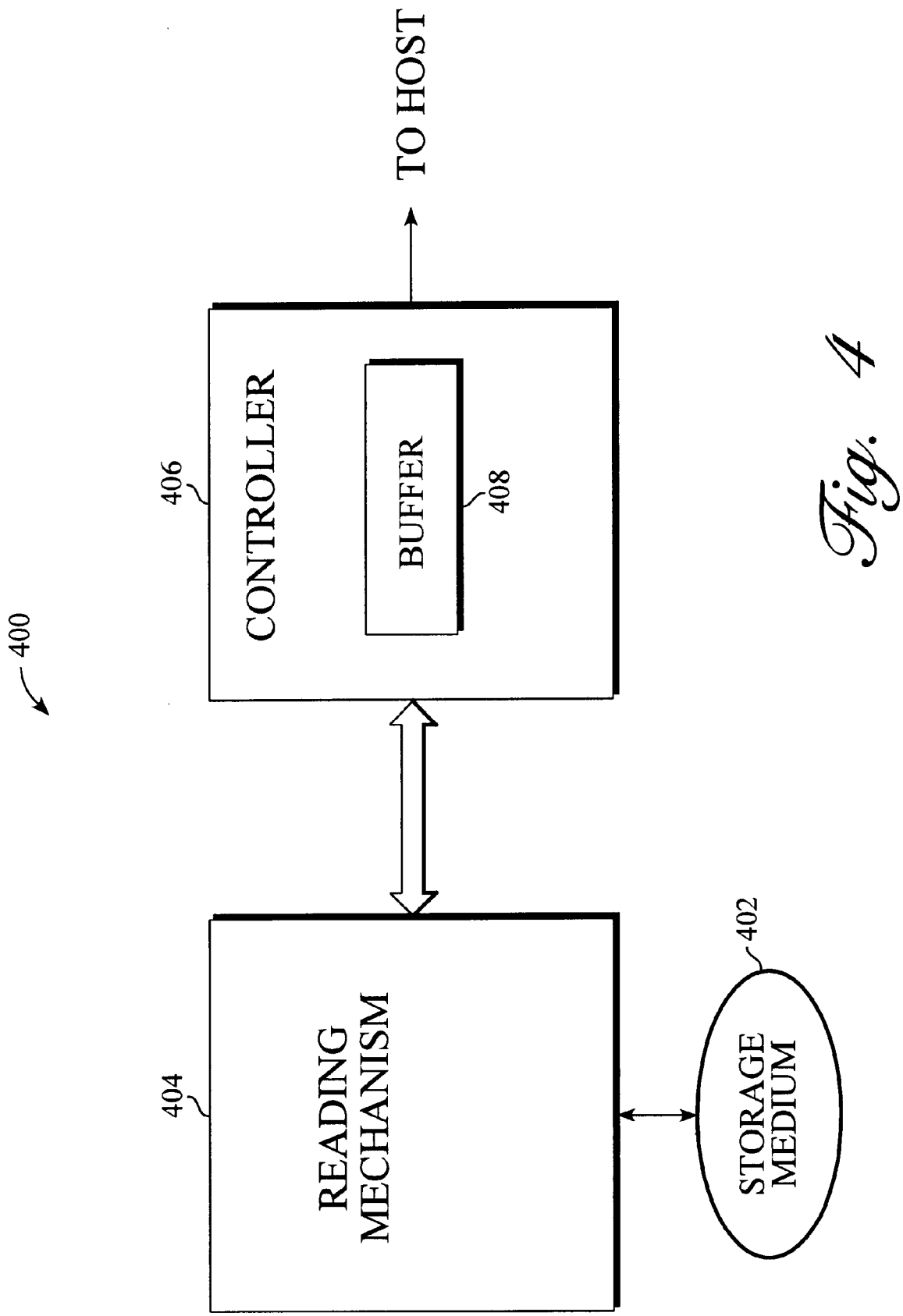
FIG. 4 is a block diagram of a system in which the present invention may be implemented.

With reference to FIG. 4, there is shown a block diagram of a storage system 400 in which the present invention may be implemented. The storage system 400 first comprises a storage medium 402 for storing information, data, computer instructions, etc. For purposes of the present invention, the storage medium 402 may take the form of any medium capable of storing digital and/or analog signals, including but not limited to an optical medium (e.g. CD-ROM, recordable CD, rewritable CD, etc.), a magnetic medium (e.g. floppy disk, hard disk, tape, etc.), and a memory (e.g. RAM, ROM, PROM, flash memory, etc.).

System 400 further comprises a reading mechanism 404 for extracting information from the storage medium 402. The form of the reading mechanism 404 will depend upon the form of the storage medium 402. For example, if the storage medium 402 is a CD, then the reading mechanism 404 may comprise a laser, a mechanism for positioning the laser, and a detection mechanism. On the other hand, if the storage medium 402 is a magnetic disk, then the reading mechanism 404 may comprise a magnetic head and a motor for positioning the head onto various portions of the disk. These and other forms are possible for the reading mechanism 404.

The storage system 400 further comprises a controller 406 for controlling the overall operation of the system 400. Specifically, among other functions, the controller 406: (1) controls the manner in which information is read from the storage medium 402 by the reading mechanism 404; (2) performs whatever processing is needed to prepare the information for a host; and (3) controls whether and how the information is buffered prior to transmission to the host. In one embodiment, it is the controller 406 that implements the methodology of the present invention. The controller 406 may comprise a buffer 408 for storing information read from the storage medium 402 prior to sending the information on to the host. Buffer 408 may take the form of any storage device, such as a random access memory (RAM), having relatively fast access times (faster than the access time of the storage medium 402). One of the advantages of using the buffer 408 is that it enables information from the storage medium 402 to be stored and manipulated prior to being sent to the host. In the embodiment shown in FIG. 4, the buffer 408 is incorporated into the controller 406. However, it should be noted that if so desired, buffer 408 may be implemented as a separate component. This and other modifications are within the scope of the present invention.

Figure 5:
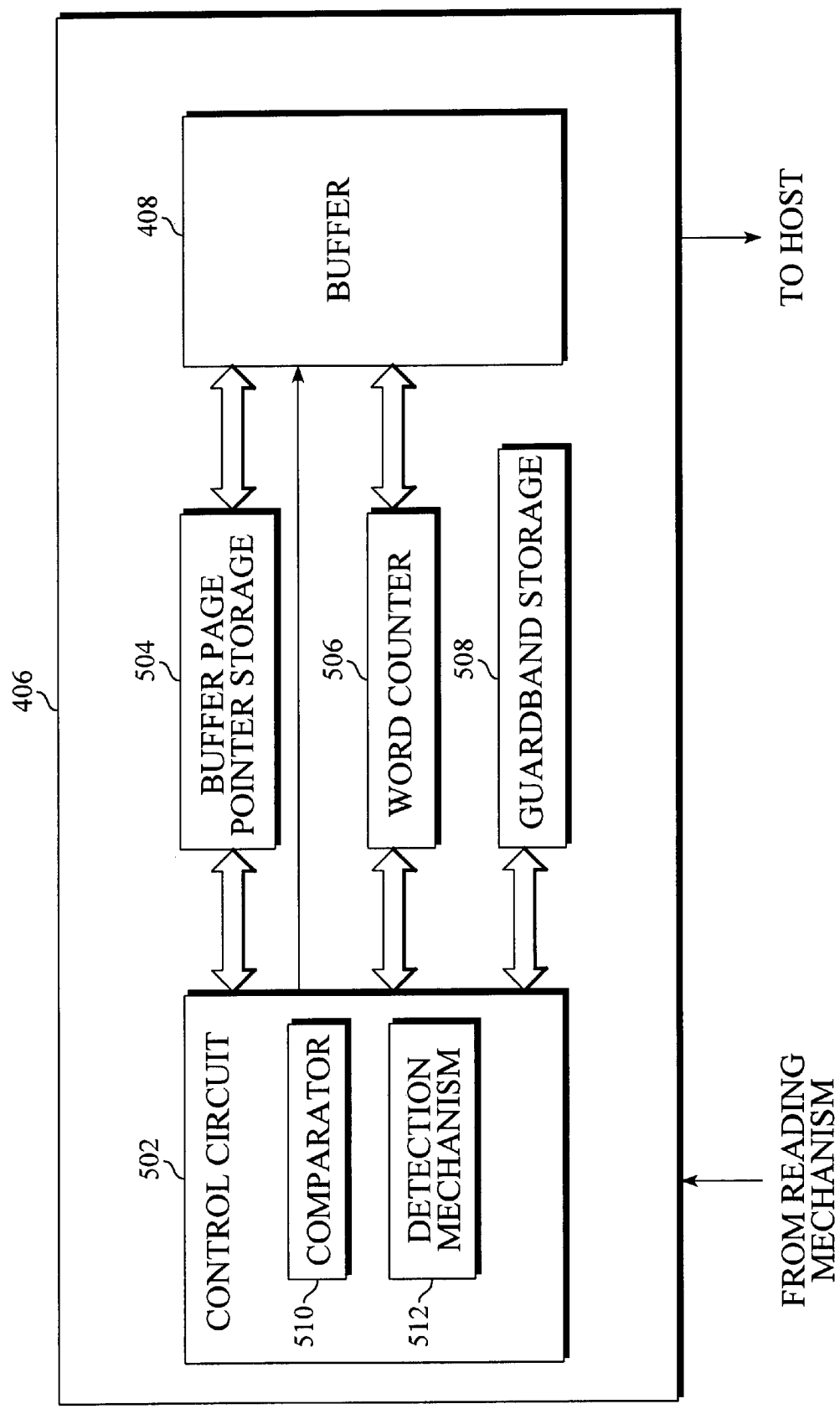
FIG. 5 is a detailed block diagram of a first embodiment of the controller of the present invention.

With reference to FIG. 5, there is shown a detailed block diagram of one embodiment of the controller 406. As shown in FIG. 5, in addition to buffer 408, the controller 406 comprises a buffer page pointer storage 504, a word counter 506, a guardband storage 508, and a control circuit 502. The pointer storage 504 stores a buffer page pointer which points to a particular page in the buffer 408. It is to this buffer page that information read from the storage medium 402 is currently being stored. The pointer in the pointer storage 504 may be incremented by the control circuit 502 to point to a next buffer page under the proper circumstances (to be discussed below).

The word counter 506 is the component responsible for maintaining a count of how many words have been read from the storage medium 402. Each time a word is read and received from the storage medium 402, the control circuit 502 increments the word counter 506. The word counter 506 has a maximum word count value that it can reach, and once it reaches that maximum value, it resets to zero. In one embodiment, the maximum value is equal to N, the number of words in a typical block (FIG. 3). The word counter 506 may also be reset by the control circuit 502 under other proper circumstances (to be discussed below). In addition to indicating how many words have been received, the value in the word counter 506 also indicates the buffer location within a particular buffer page at which the next word should be stored. Thus, the pointer in the pointer storage 504 indicates the particular buffer page while the value in the word counter 506 indicates the particular location within that page at which the next word should be stored. Hence, the buffer page pointer and the word count value may be used to specify a specific buffer location.

The controller 502 further comprises a guardband storage 508 for storing a predetermined guardband value. In one embodiment, the guardband value, which may be between zero and N, is set such that it is larger than any anticipated block overflow. For example, if a link block 310 may exceed the typical block size (N) by X words (thereby having a size of N+X), then the guardband value should be set to at least X+1. The larger the guardband value, the greater the amount of overflow that the controller 406 can tolerate. The use of the guardband value will be elaborated upon in a later section.

The overall operation of the controller 406 is controlled by the control circuit 502. Control circuit 502 comprises all of the control logic necessary for managing the operation of the various components to implement the methodology of the present invention. In addition, control circuit 502 comprises a comparator 510 and a detection mechanism 512. In one embodiment, the control circuit 502 is implemented using hardware logic components, including but not limited to combinatorial logic components, storage components, etc. A hardware implementation maximizes the speed performance of the circuit 502. However, if so desired, control circuit 502 may also be implemented using a processor specifically programmed to implement the methodology of the present invention. This and other modifications are within the scope of the present invention.

Figure 6:
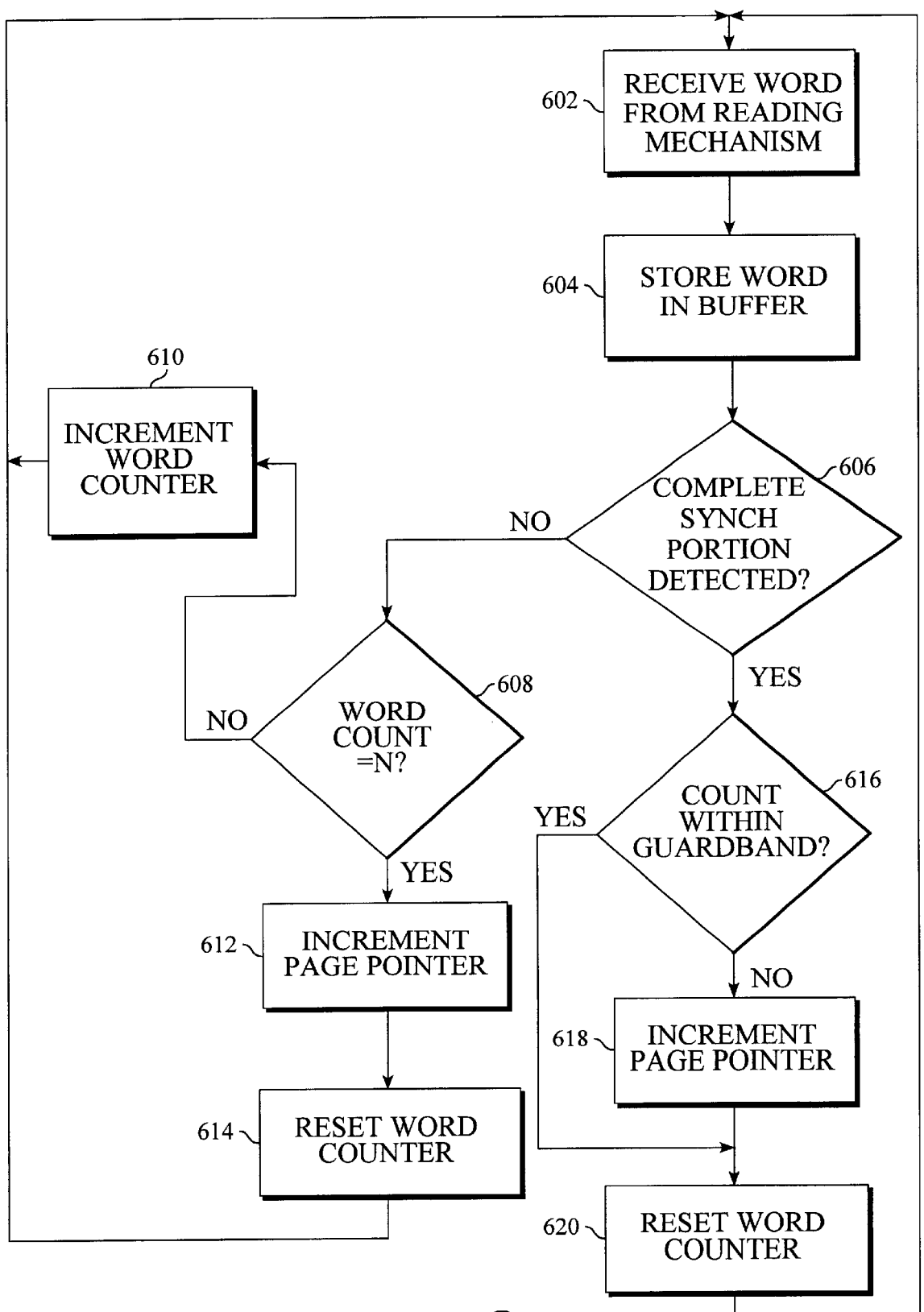
FIG. 6 is a flow diagram illustrating the flow of operation of a first embodiment of the controller of the present invention.

With reference to the flow diagram of FIG. 6, the operation of the controller 406 will now be described. The controller 406 begins operation by receiving (602) from the reading mechanism 404 a word that has been read from a block of the storage medium 402. Upon receiving the word, the control circuit 502 stores (604) the word into the buffer 408 at a buffer location specified by the current value in the word counter 506 in a particular buffer page specified by the current pointer in the pointer storage 504.

Once that is done, the control circuit 502 determines (606) whether an indication of the beginning of a new or subsequent block has been detected. In one embodiment, this determination is made by invoking the detection mechanism 512 to check for the presence of a complete SYNCH portion. Specifically, the detection mechanism 512 processes the incoming word to determine whether it is the last portion of a SYNCH portion. A SYNCH portion usually contains special information in a specific format for indicating the beginning of a block, and it is this special information that the detection information is trying to detect. The specific information needed to constitute a SYNCH portion is mainly a matter of design choice and, thus, will vary from implementation to implementation.

If a SYNCH portion is not detected, then the control circuit 502 proceeds to determine (608) whether the word counter 506 has reached its maximum count value of N. If it has not, then the control circuit 502 increments (610) the word counter 506 and loops back to receive (602) the next word. On the other hand, if the maximum count value has been reached, then the control circuit 502 increments (612) the page pointer in the pointer storage 504 to cause the pointer to point to a next buffer page in the buffer 408. Then, the word counter 506 is reset (614) to zero. Once that is done, the control circuit 502 loops back to receive (602) the next word from the reading mechanism 404.

Returning to operation (606), if the detection mechanism 512 determines that a SYNCH portion has been detected, then the control circuit 502 determines (616) whether the current word count is within the predetermined guardband value. In one embodiment, this determination is made by invoking the comparator 510 to compare the current word count in the word counter 506 with the value stored in the guardband storage 508. If the current word count is greater than the guardband value, then the word count is considered to be outside the guardband. In such a case, the control circuit increments (618) the page pointer in the pointer storage 504 to cause the pointer to point to a next buffer page in the buffer 408, resets the word counter 506 to zero, and loops back to receive (602) another word. On the other hand, if the current word count is less than or equal to the guardband value, then the word count is considered to be within the guardband. If that is the case, then the control circuit 502 merely resets (620) the word counter 506, and loops back to receive (602) another word. The control circuit 502 does not increment the page pointer in the pointer storage 504 if the current word count is within the guardband. By maintaining the page pointer at its current value, the control circuit 502 prevents an oversized block from being buffered in two buffer pages, thereby preventing the oversized block from being counted as two blocks.

Figure 7:
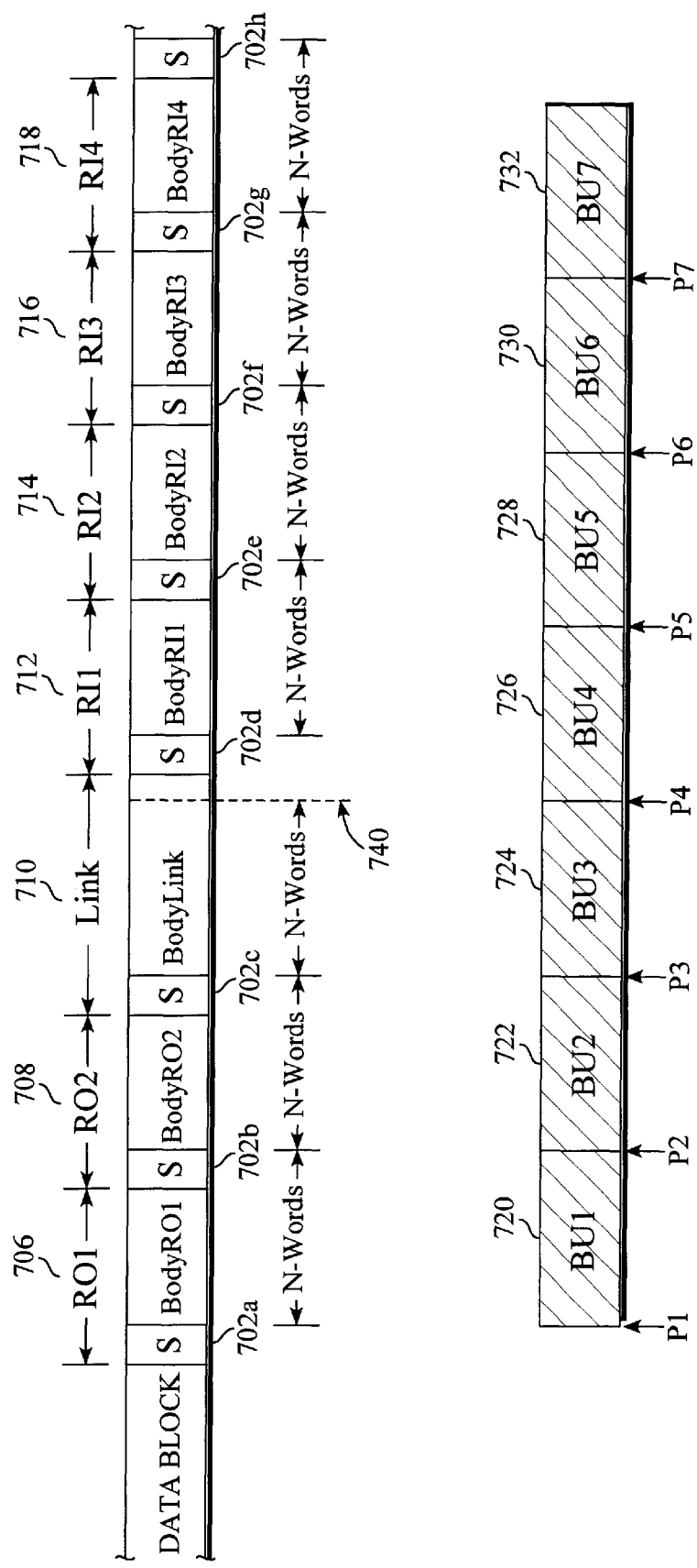
FIG. 7 is a logical diagram illustrating the manner in which a link sequence having an oversized link block may be properly read and buffered in accordance with one embodiment of the present invention.

To illustrate how the present invention solves the reading problem described above, the operation of the controller 406 will now be described with reference to a sample link sequence (shown in FIG. 7) wherein the link block 710 is larger than the rest of the link sequence blocks 706, 708, 712–718. FIG. 7 also shows a portion of the buffer 408, comprising buffer portions BU1–BU7, which is used to buffer the information contained in the link sequence blocks 706–718. Given the arrangement shown in FIG. 7, the controller 406 of the present invention operates as follows.

Initially, the controller 406 receives from the reading mechanism 404 the SYNCH portion 702a of the first RUNOUT block 706. As each word in the SYNCH portion 702a is received, the word is stored into a buffer portion (not shown) preceding BU1 720, and the word counter 506 is incremented. This continues until all of the words in the SYNCH portion 702a have been received. Once that occurs, the detection mechanism 512 detects that a complete SYNCH portion has been received. In response to the detection of the complete SYNCH portion, the control circuit 502 determines whether the current word count is within the guardband. This determination is made by invoking the comparator 510 to compare the current word count in the word counter 506 with the guardband value in the guardband storage 508. Assuming that the current word count is outside the guardband, the control circuit 502 increments the buffer page pointer in the pointer storage 504 to point to the beginning (P1) of buffer portion BU1 720, and resets the word counter 506. Thus, the next word received from the reading mechanism 404 will be stored into the first location of BU1 720.

Thereafter, the controller 406 receives the words for the body BODYRO1 of RUNOUT block 706 and the SYNCH portion 702b of RUNOUT block 708. As each word is received, the control circuit 502: (1) stores the word into BU1 at a buffer location indicated by the word count; (2) determines whether a complete SYNCH portion has been detected; (3) determines whether the maximum word count has been reached; and (4) increments the word counter 506. Between BODYRO1 and the end of SYNCH portion 702b, no complete SYNCH portion will be detected. In addition, the maximum count value of N will not be reached until the end of the SYNCH portion 702b. Thus, no actions are taken except to store each word into BU1 720, and to increment the word counter 506. In this manner, the contents of BODYRO1 and SYNCH portion 702b are buffered into BU1 720.

When all of the words of SYNCH portion 702b have been received, the detection mechanism 512 again detects that a complete SYNCH portion has been received. In response to this detection, the control circuit 502 determines whether the current word count is within the guardband. At this point, the current word count is at the maximum value of N, and since the guardband is set to less than N, the current word count is outside the guardband. Thus, the control circuit 502 increments the buffer page pointer to point to the beginning (P2) of buffer portion BU2 722, and resets the word counter 506. The next word that is received from the reading mechanism 404 will be stored into the first location of BU2 722. In the same manner as that described in connection with BODYRO1 and SYNCH portion 702b, BODYRO2 and SYNCH portion 702c are received and stored into BU2 722.

When all of the words of SYNCH portion 702c have been received, the detection mechanism 512 again detects the receipt of a complete SYNCH portion. In response to this detection, the control circuit 502 determines whether the current word count is within the guardband. At this point, the current word count is again at the maximum value of N; hence, it is outside the guardband. Thus, the control circuit 502 increments the buffer page pointer to point to the beginning (P3) of buffer portion BU3 724, and resets the word counter 506. The next word that is received from the reading mechanism 404 will be stored into the first location of BU3 724.

Thereafter, the controller 406 receives the words for the body BODYLINK of the link block 710. As each word is received, the word is stored into a buffer location in BU3 724 indicated by the word count, and the word counter 506 is incremented. This process continues (thereby, filling BU3 with the contents of BODYLINK) until s the portion of BODYLINK indicated by the dashed line 740 is reached. At dashed line 740, an N number of words will have been received without detecting a complete SYNCH portion. In response to such a condition, the control circuit 502 increments the buffer page pointer to point to the beginning (P4) of buffer portion BU4 726, and resets the word counter 506. Thus, the next word that is received from the reading mechanism 404 will be stored into the first location of BU4 726.

Thereafter, the controller 406 continues receiving words for the remainder of BODYLINK, as well as the words for SYNCH portion 702d. As each word is received, the word is stored into a buffer location in BU4 726 indicated by the word count, and the word counter 506 is incremented. Thus, the remainder of BODYLINK and the SYNCH portion 702d are stored into the first part of BU4 726. When all of the words of the SYNCH portion 702d have been received, the detection mechanism 512 again detects the receipt of a complete SYNCH portion. In response to this detection, the control circuit 502 determines whether the current word count is within the guardband. This time, since the word counter 506 was just recently reset at dashed line 740, the current word count is not very large. Assuming that the guardband value is set sufficiently large such that it catches this degree of oversize, the current word count should be within the guardband. In such a case, the control circuit 502 does not increment the page pointer, but rather maintains the page pointer at its current value. By maintaining the page pointer at its current value, the control circuit 502 prevents the oversized link block 710 from being counted as two blocks. The control circuit 502 does, however, reset the word counter 506 in response to the detection of the complete SYNCH portion 702d. Thus, the next word that is received from the reading mechanism 404 will again be stored into the first location of BU4 726.

Thereafter, the controller 406 receives the words for the body BODYRI1 of the RUNIN block 712, and the SYNCH portion 702e. As each word is received, the word is stored into a buffer location in BU4 726 indicated by the word count, and the word counter 506 is incremented. Between BODYRI1 and the end of SYNCH portion 702e, no complete SYNCH portion will be detected. In addition, the maximum count value of N will not be reached until the end of the SYNCH portion 702e. Thus, no actions are taken except to store each word into BU4 726, and to increment the word counter 506. In this manner, the contents of BODYRI1 and SYNCH portion 702e are buffered into BU4 726. Notice that in storing BODYRI1 and SYNCH portion 702e into BU4 726, the information that was previously written into BU4 726 (i.e. the remainder of BODYLINK and the SYNCH portion 702d) is overwritten. However, since the link block 710 is a link sequence block, and since link sequence blocks contain no actual data, overwriting a part of a link sequence block will not do any harm. Thus, the present invention prevents overcounting without incurring any harmful side effects. According to one embodiment, the methodology of the present invention is applied only to blocks which do not contain actual data.

In the manner described above, BODYRI1 and SYNCH portion 702e are stored into BU4 726. Similarly, BODYRI2 and SYNCH portion 702f are stored into BU5 728. BODYRI3 and SYNCH portion 702g are stored into BU6 730, and BODYRI4 and SYNCH portion 702h are stored into BU7 732. Notice that at the end of the process, only seven buffer portions BU1–BU7 (as opposed to eight for the prior art) are used to buffer the seven link sequence blocks 706–718. This is so despite the fact that the link block 710 is oversized. Thus, with the present invention, it is possible to read variably sized blocks, including oversized blocks, without overcounting. By preventing overcounting, the present invention prevents subsequent errors from being experienced by a host.

Figure 8:
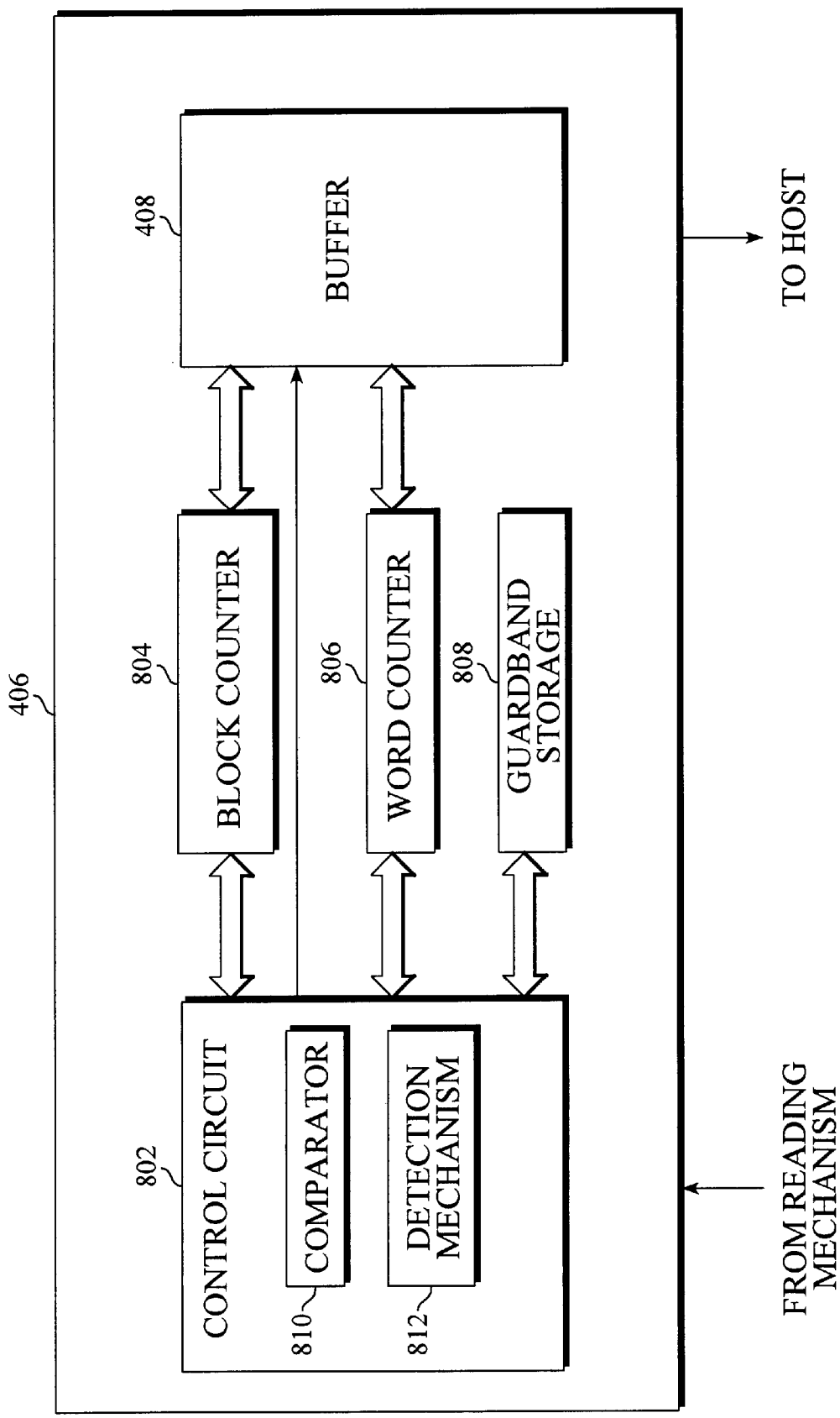
FIG. 8 is a detailed block diagram of a second embodiment of the controller of the present invention.
Figure 9:
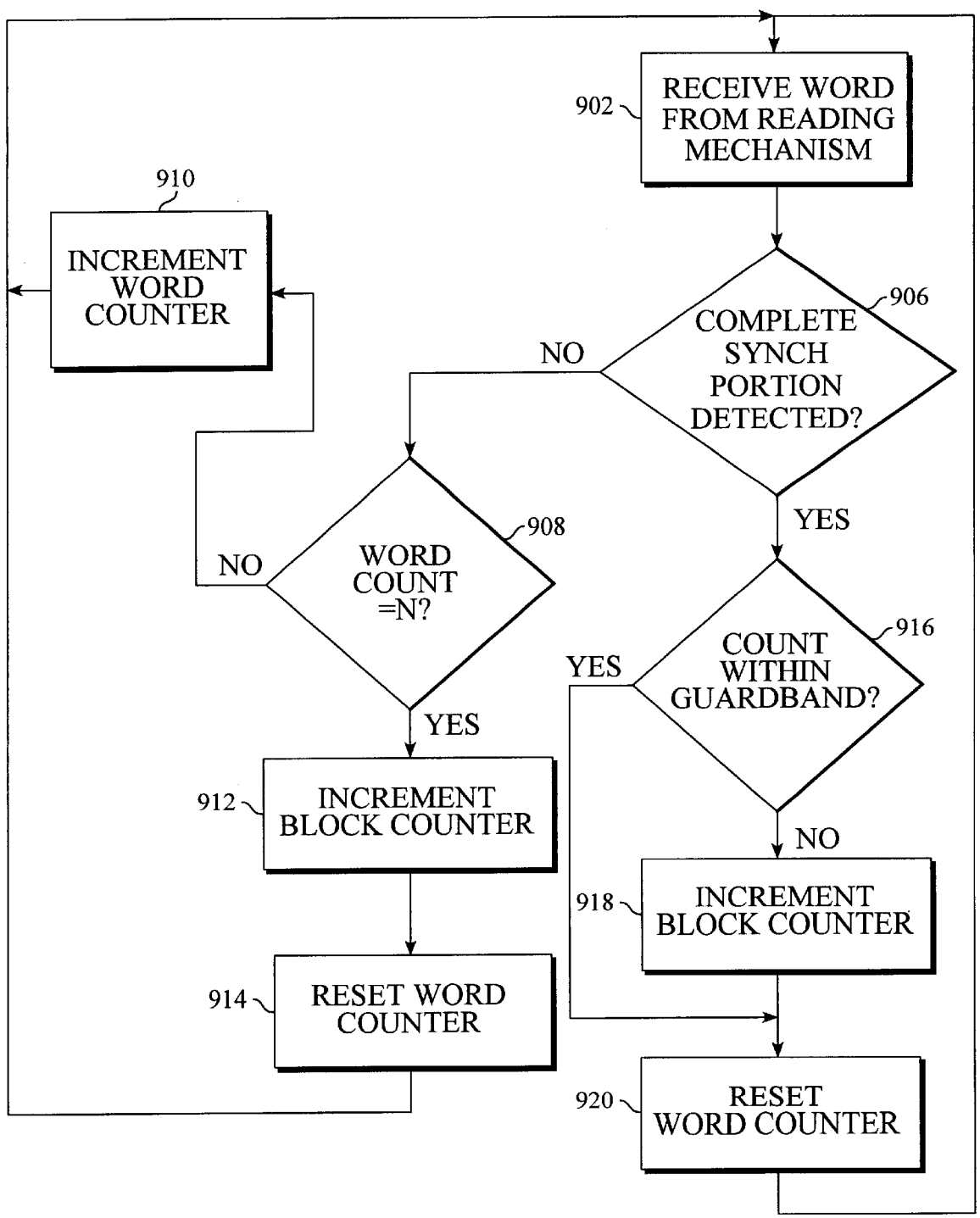
FIG. 9 a flow diagram illustrating the flow of operation of a second embodiment of the controller of the present invention.

Thus far, the invention has been described in connection with a buffering scheme in which the link sequence blocks 706–718 are actually buffered. It should be noted that the invention may also be used in a buffering scheme in which only data blocks are buffered. In such an application, the invention may be used to prevent overcounting of the link sequence blocks. The embodiment described previously may be easily adapted to accommodate this application. Specifically, the controller 406 may be adapted by replacing the buffer page pointer storage 504 with a block counter (FIG. 8). Also, the operational flow may be adapted to remove operation (604), since the link sequence blocks are no longer being buffered. Operations (612) and (618) may also be slightly amended. Rather than incrementing the page pointer, these operations would increment the block counter (FIG. 9). All other aspects may remain the same. Thus, the present invention may be implemented in both method 1 buffering schemes (wherein both data blocks and link sequence blocks are buffered) and method 2 buffering schemes (wherein only data blocks are buffered).

At this point, it should be noted that although the invention has been described with reference to specific embodiments, it should not be construed to be so limited. Various modifications can be made by those of ordinary skill in the art with the benefit of this disclosure without departing from the spirit of the invention. Thus, the invention should not be limited by the specific embodiments used to illustrate it but only by the scope of the appended claims.

What is claimed is:

1. In a storage system wherein information is stored on a storage medium in blocks, a method for reading information from the storage medium, comprising the acts of:

receiving at least one word read from a block of the storage medium;

maintaining a word count of number of words received;

determining whether an indication of a beginning of a subsequent block has been detected;

when a beginning of a subsequent block has been detected, determining whether the word count is no greater than a predetermined guardband value, and:

when the word count is no greater than the guardband value, maintaining a buffer page pointer at its current value, and resetting the word count to an initial word count value; and when the word count is greater than the guardband value, incrementing the buffer page pointer to point to a next buffer page, and resetting the word count to the initial word count value.

2. The method of claim 1, further comprising the acts of:

when said beginning of said subsequent block has not been detected, determining whether said word count has reached a predetermined maximum count value; and when said word count has reached a predetermined maximum count value:

resetting said word count to said initial word count value; and incrementing said buffer page pointer to point to said next buffer page.

3. The method of claim 2, further comprising: when said beginning of said subsequent block has not been detected, and said word count has not reached said maximum count value, maintaining said word count at its current value.

4. The method of claim 2, further comprising choosing said guardband value to be less than said maximum count value.

5. The method of claim 4, further comprising the act of:

storing at least one of said words into a buffer at buffer locations indicated by said buffer page pointer and said word count.

6. In a storage system wherein information is stored on a storage medium in blocks, a method for reading information from the storage medium, comprising the acts of:

receiving at least one word read from a block of the storage medium;

maintaining a word count of the amount of number of words received;

determining whether an indication of a beginning of a subsequent block has been detected;

when a beginning of a subsequent block has been detected, determining whether the word count is no greater than a predetermined guardband value, and:

when the word count is no greater than the guardband value, maintaining a block counter at its current value, and resetting the word count to an initial word count value; and when the word count is greater than the guardband value, incrementing the block counter to a next block counter value and resetting the word count to the initial word count value.

7. The method of claim 6, further comprising the acts of:
when said beginning of said subsequent block has not been detected, determining whether said word count has reached a predetermined maximum count value; and
said word count has reached the maximum count value:
resetting said word count to said initial word count value; and
incrementing said block counter.

8. The method of claim 7, further comprising: when said beginning of said subsequent block has not been detected, and said word count has not reached said maximum count value, maintaining said word count at its current value.

9. The method of claim 7, further comprising choosing said guardband value to be less than said maximum count value.

10. In a storage system wherein information is stored on a storage medium in blocks, an apparatus for controlling the reading of information from the storage medium, comprising:
a first storage for storing a buffer page pointer;
a second storage for storing a predetermined guardband value;
a counter for maintaining a word count value; and
a control circuit coupled to the first storage, the second storage, and the word counter, the control circuit receiving a plurality of words read from a block of the storage medium and incrementing the word count for each word received, the control circuit detecting an indication of a beginning of a subsequent block, and when a beginning of a subsequent block is detected, determining if the word count is no greater than the guardband value, and:
when the word count is no greater than the guardband value, maintaining the buffer page pointer at its present value and resetting the word count to an initial word count value; and
when the word count is greater than the guardband value, incrementing the buffer page pointer to a next buffer page and resetting the word count to the initial word count value.

11. The apparatus of claim 10, wherein said control circuit comprises:
a comparator for comparing said word count value with said guardband value to determine whether said word count value is within said guardband value; and
a detection mechanism for processing said plurality of words to determine whether an indication of the beginning of a subsequent block has been detected.

12. The apparatus of claim 10, wherein said control circuit stores said plurality of words into a buffer at buffer locations indicated by said buffer page pointer and said word count value.

13. The apparatus of claim 10, wherein, when said beginning of said subsequent block is not detected, said control circuit further determines whether said word count value has reached a predetermined maximum count value, and in response to a determination that said word count value has reached a predetermined maximum count value, said control circuit resets said counter and increments said buffer page pointer to cause said buffer page pointer to point to said next buffer page.

14. The method of claim 13, further comprising: when said beginning of said subsequent block has not been detected, and said word count has not reached said maximum count value, maintaining said word count at its current value.

15. The apparatus of claim 14, wherein said guardband value is less than said maximum count value.

16. In a storage system wherein information is stored on a storage medium in blocks, an apparatus for controlling the reading of information from the storage medium, comprising:
a first counter for maintaining a block count value;
a second counter for maintaining a word count value;
a storage for storing a predetermined guardband value; and
a control circuit coupled to the first counter the second counter, and the storage, the control circuit receiving a plurality of words read from a block of the storage medium and incrementing the word count for each word received, the control circuit an indication of a beginning of a subsequent block, and when a beginning of a subsequent block is detected, determining if the word count is no greater than the guardband value, and:
when the word count is no greater than the guardband value, maintaining the block count value at its current value and resetting the word count to an initial word count value; and
when the word count is greater than the guardband value, incrementing the block count value to a next block counter value and resetting the word count to an initial word count value.

17. The apparatus of claim 16, wherein said control circuit comprises:
a comparator for comparing said word count value with said guardband value to determine whether said word count value is within said guardband value; and
a detection mechanism for processing said plurality of words to determine whether an indication of the beginning of a subsequent block has been detected.

18. The apparatus of claim 16, wherein, when said beginning of said subsequent block is not detected, said control circuit further determines whether said word count value has reached a predetermined maximum count value, and in response to a determination that said word count value has reached a predetermined maximum count value, said control circuit resets ,said second counter and increments said first counter.

19. The method of claim 18, further comprising: when said beginning of said subsequent block has not been detected, and said word count has not reached said maximum count value, maintaining said word count at its current value.

20. The apparatus of claim 19, wherein said guardband value is less than said maximum count value.

* * * * *